Dec. 26, 1922.
O. L. ENGSTROM.
COMBINATION RULE.
FILED SEPT. 20, 1921.
1,440,284
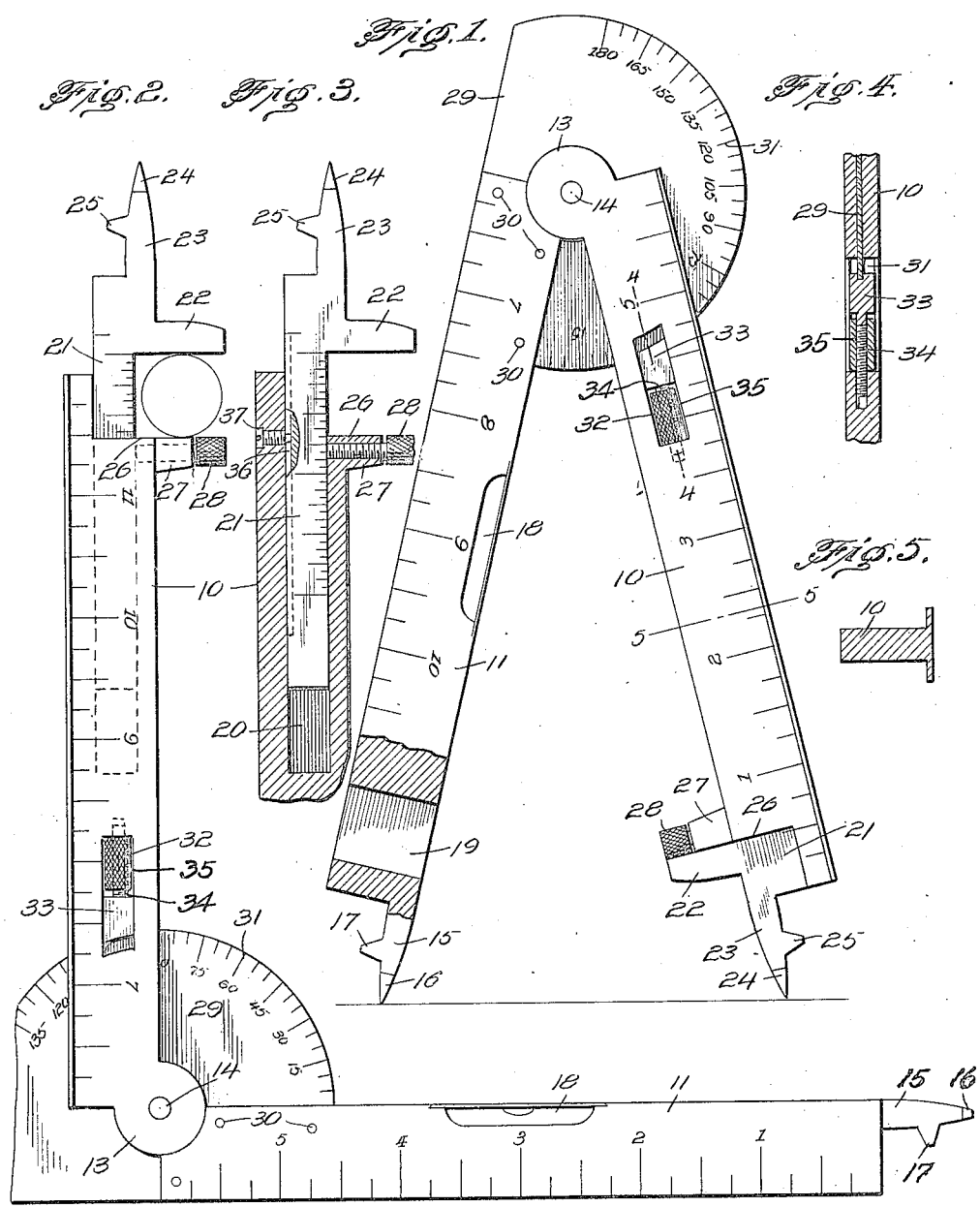
O. L. Engstrom, INVENTOR.
BY Geo. P. Kimmel, ATTORNEY.

Patented Dec. 26, 1922.

1,440,284

UNITED STATES PATENT OFFICE.

OTTO L. ENGSTROM, OF SOUTH BEND, INDIANA.

COMBINATION RULE.

Application filed September 20, 1921. Serial No. 501,965.

*To all whom it may concern:*

Be it known that I, OTTO L. ENGSTROM, a citizen of the United States, residing at South Bend, in the county of St. Joseph and State of Indiana, have invented certain new and useful Improvements in Combination Rules, of which the following is a specification.

This invention relates to combination implements in which various tools are coactively associated and in interdependent relations, and has for one of its objects to simplify the construction and increase the efficiency and utility of devices of this character.

With these and other objects in view, the invention consists in certain novel features of construction as hereinafter shown and described and then specifically pointed out in the claim, and in the drawings illustrative of the preferred embodiment of the invention;—

Figure 1 is a side elevation of the improved implement partly in section, illustrating the use as dividers or as inside calipers.

Fig. 2 is a view with the legs of the implement arranged for use as a square, and as inside calipers.

Fig. 3 is a sectional detail of the inside calipers construction.

Fig. 4 is a section on the line 4—4 of Fig. 1.

Fig. 5 is a section of one of the legs of the implement on the line 5—5 of Fig. 1.

The improved implement comprises two main members or "legs" 10 and 11, one of which is preferably T-shaped transversely, as illustrated in Fig. 5, the legs being united at one end by a rule joint which includes semi-circular portions 12 and pivot pin 14.

An extension 15 is formed on the free end of the "leg" member 11 and terminates in a point 16 preferably of tempered steel to form one point of a pair of dividers, and projecting laterally from the extension 15 is a spur like member 17 which constitutes one part of an inside caliper device, as hereafter described.

The "leg" member 11 is also provided with a level bulb, indicated conventionally at 18, and a relatively large opening 19 therethrough at one end.

The other "leg" member 10 is provided with a longitudinally directed guide socket 20 opening through the end of the "leg," and movably disposed in this socket is a bar 21, the latter having an offset 22 and a reduced extension 23, terminating in a steel point 24. The extension also carries a lateral spur 25.

The extension 23 with its point 24 forms the other "member" of the divider device and coacts with the extension 15 and its point 16, while the spur 25 forms the other member of the inside caliper device and coacts with the spur 17 of the extension 15. The "leg" member 10 is reduced at its free end as shown at 26, and provided with a lateral extension 27 whose outer face forms the other jaw of the outside caliper device and coacts with the other jaw member 22.

A clamp screw 28 is tapped through the jaw member 27 to engage the bar 21 and hold it in adjusted position.

The members 22 and 26 thus coact to produce an effectual outside caliper device, as illustrated in Figs. 2 and 3, while the spurs 17 and 25 coact to provide an effectual inside caliper device.

The members 10 and 11 are formed with longitudinally directed kerfs at their jointed ends to receive a semi-circular plate 29, the latter being rigidly connected as by rivets 30 to one of the leg members for instance the leg member 11, and is graduated in degrees as shown at 31 and constitutes a protractor member in coaction with the other leg member 10. The leg member 10 is also provided with an opening 32, and movable in the opening is a locking block 33 having a curved groove in one face to engage over the adjacent curved edge of the protractor plate 29, as illustrated in Fig. 4.

The block 33 is formed with a threaded stem 34 with which a cylinder nut 35 engages with its surface "milled" and operable through the opening 31. By this means a simple device is produced whereby the leg member 10 may be "locked" in position relative to the protractor plate.

The members 10 and 11 are graduated in inches and fractions of inches, and thus constitutes a convenient measuring rule, and the bar 21 is likewise graduated to denote the width of the space between the caliper jaws 22 and 26.

The bar 21 is formed with a longitudinally directed guideway, indicated at 36, and adapted to receive the inner end of a stop pin 37 tapped through the adjacent wall of the member 10, as shown in Fig. 3.

By this means the bar 21 is held from removal from the member 10, while at the same time left free to be adjusted longitudinally of the leg member within the range of the guideway 36, as will be obvious.

The improved implement will be constructed of metal except the level bulb 18, and of any required size or capacity, and will not necessarily exceed in size an ordinary two foot rule, besides the projecting portion of the protractor plate.

The improved implement will be found very useful for mechanics in doing various pieces of work, as it is adapted to various uses as will be obvious.

The preferred embodiment of the invention is disclosed in the drawings and set forth in the specification, but it will be understood that modifications within the scope of the claim may be made in the construction without departing from the principle of the invention or sacrificing any of its advantages.

Having thus described the invention, what is claimed as new is:—

An implement of the class described comprising coacting leg members pivotally united at one end and provided respectively with longitudinally directed kerfs in their pivoted ends, one of said leg members having transverse slots communicating with the kerf thereof, a graduated protractor plate engaging in said kerfs, means for rigidly connecting said protractor plate to one of said leg members, a locking block movable in said slot, and means for forcibly compressing said block against said protractor plate to lock the leg member which carries the block and slot in adjusted position.

In testimony whereof, I affix my signature hereto.

OTTO L. ENGSTROM.